July 1, 1958 W. F. BIRD 2,841,205
METHOD OF AND APPARATUS FOR MAKING
POLYURETHANE FOAM COATED FABRICS
Filed July 13, 1955 3 Sheets-Sheet 1
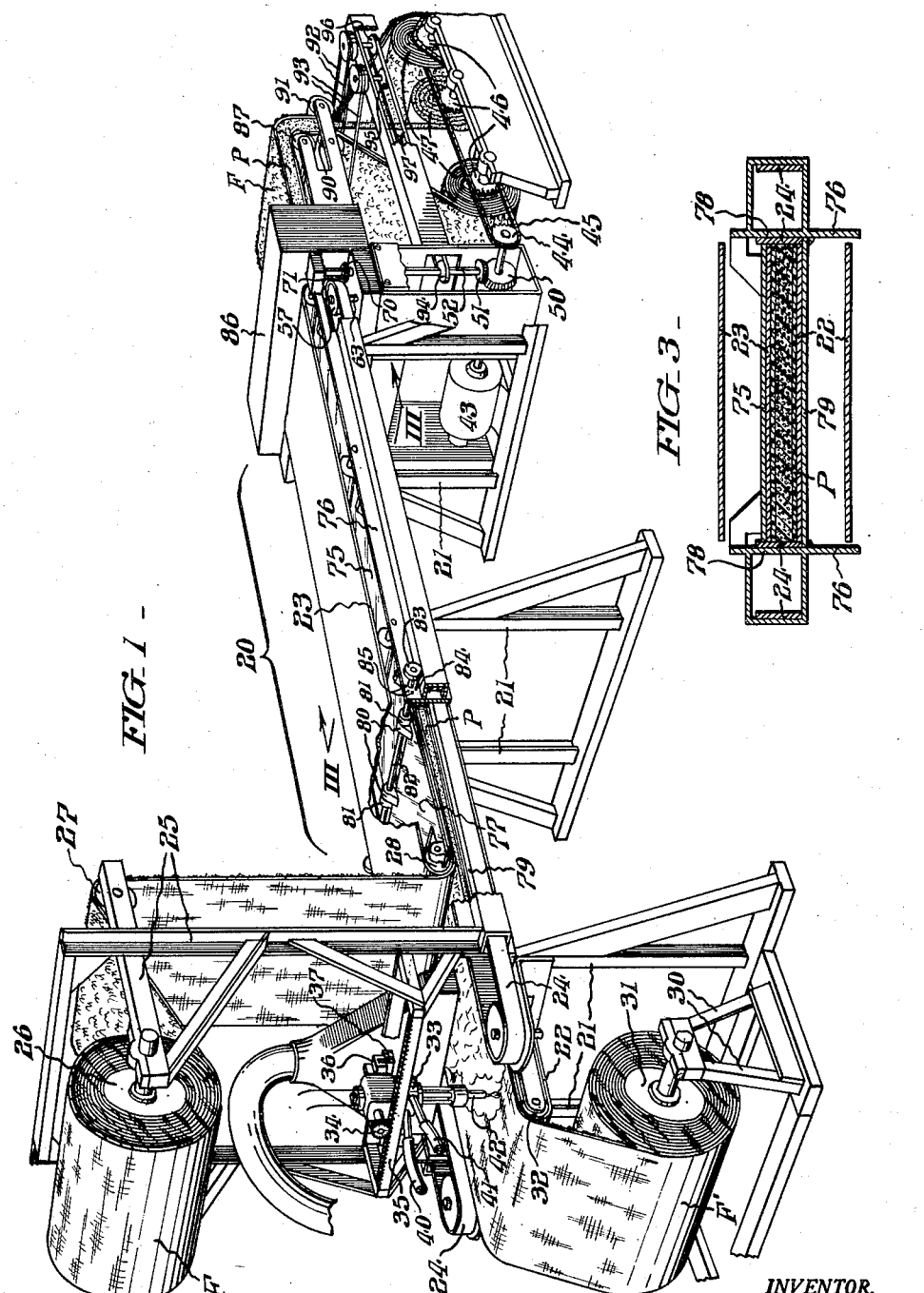
INVENTOR.
*Whitworth F. Bird,*
BY *Paul & Paul*
ATTORNEYS.

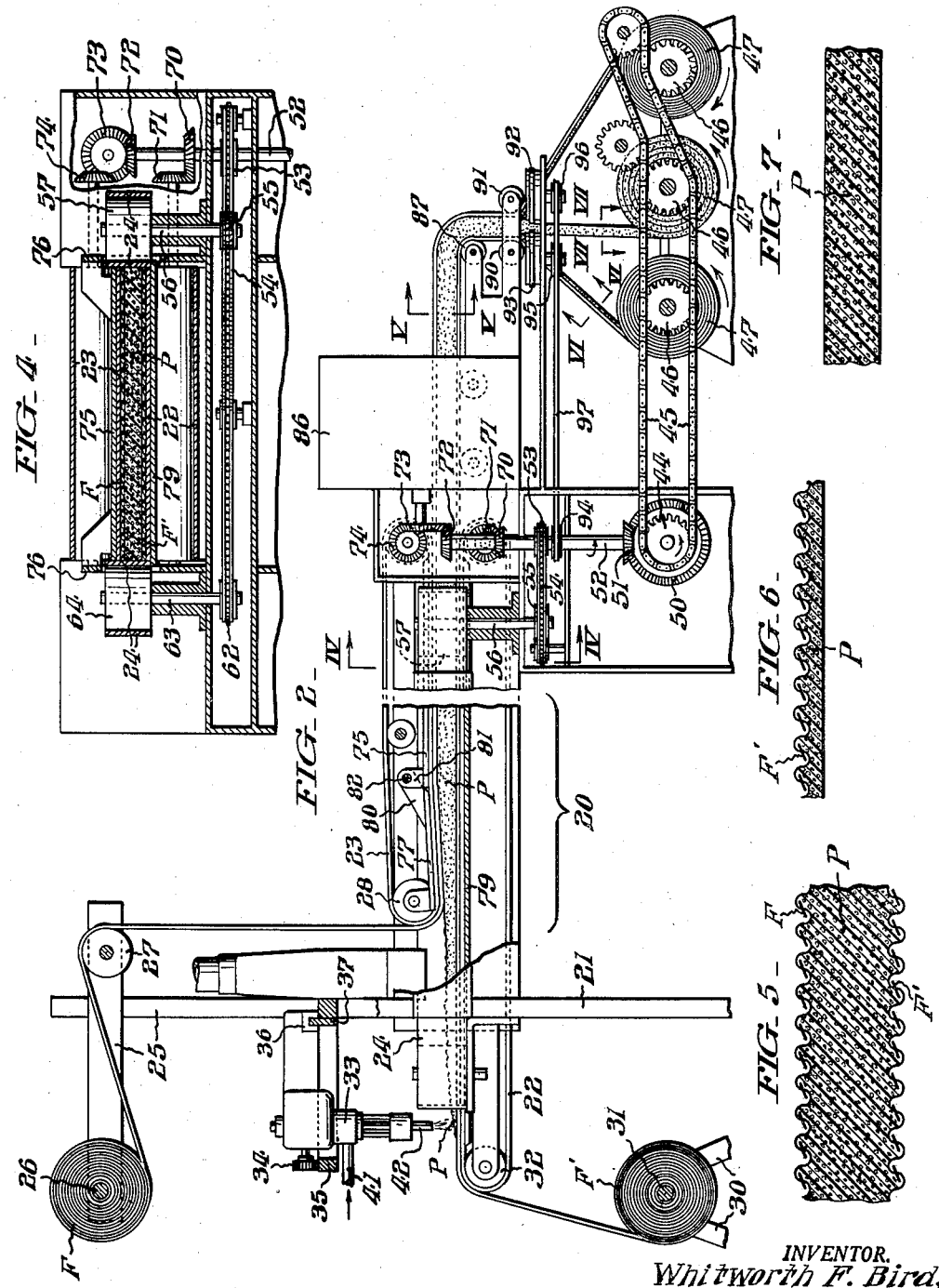

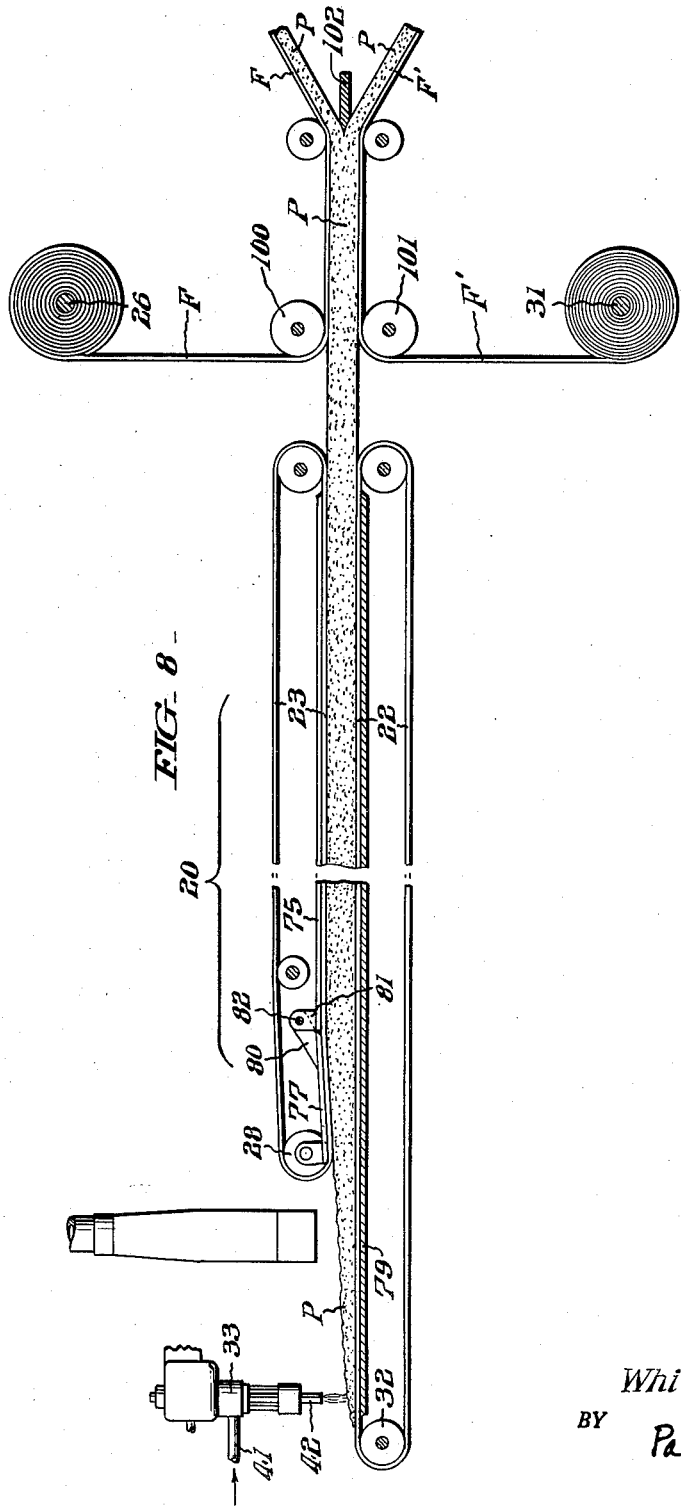

United States Patent Office 2,841,205
Patented July 1, 1958

2,841,205

METHOD OF AND APPARATUS FOR MAKING POLYURETHANE FOAM COATED FABRICS

Whitworth F. Bird, Riverside, Conn., assignor to Collins & Aikman Corporation, Philadelphia, Pa., a corporation of Delaware Application July 13, 1955, Serial No. 521,746

11 Claims. (Cl. 154—37)

This invention relates to a method of and apparatus for making polyurethane foam coated fabrics. More specifically, this invention relates to a method of and machine for making fabric having, on one face only, a thin, porous and uniform coating of polyurethane foam.

This invention further relates to a method for the concurrent production of polyurethane foam coated fabric and polyurethane sheet having porous exposed surfaces.

This application is a continuation in part of the co-pending application of Whitworth F. Bird and Glen S. Hiers, Serial No. 400,676, filed December 28, 1953, now abandoned, wherein various methods are disclosed for producing foam rubber coated fabrics.

It is an object of this invention to provide a novel method and apparatus for producing fabrics having a coating of polyurethane foam. Another object is to provide a fabric which is coated with a foam having excellent properties of resilience, sound absorption and thermal insulation. Other objects and advantages of this invention will further become apparent hereinafter and in the drawings whereof:

Fig. 1 represents a view in perspective of an apparatus embodying features of this invention which, as shown, is arranged to produce sheets of polyurethane foam coated fabric and also to produce a sheet of polyurethane foam.

Fig. 2 represents a side view of the machine illustrated in Fig. 1, with portions of the machine being broken away, better to illustrate the apparatus.

Fig. 3 represents a sectional view taken as indicated by the lines and arrows III—III which appear in Fig. 1.

Figs. 4, 5, 6 and 7 represent sectional views taken as indicated by the lines and arrows IV—IV, V—V, VI—VI and VII—VII, respectively, which appear in Fig. 2; and Fig. 8 represents a schematic view showing a modified process in accordance with this invention.

At the outset, it is to be emphasized that this invention is directed to the production of a fabric having a chemically produced coating which is herein defined as a polyurethane foam coating. A polyurethane foam coating is prepared by carrying out a series of chemical reactions which produce a long-chain polyurethane resin and which concurrently produce carbon dioxide which forms the long-chain polyurethane resin into a foam.

Basically, polyurethane foam may be produced from an alkyd resin which, in turn, is made by reacting one mole of glycerine with two moles of ethylene glycol and two moles of adipic acid. The product is an alkyd resin having terminal OH groups and also having secondary OH groups. The alkyd resin may be represented by the following formula:

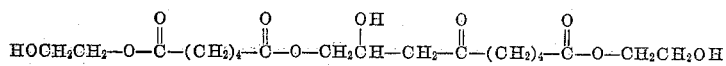

To produce the long-chain polymer, the alkyd resin referred to above is preferably reacted with an isocyanate such as toluene 2, 6 diisocyanate:

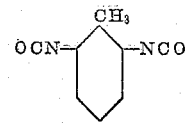

or toluene 2, 4 diisocyanate:

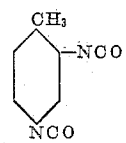

In preparing satisfactory polyurethane foams, the polyester is preferably reacted with one of the diisocyanates identified above to form a prepolymer, which may then be reacted with water to produce a long-chain polyurethane polymer and carbon dioxide. The unreacted isocyanate groups react with additional water, increasing the length of the chain. As the molecular weight of the polymer increases, its viscosity increases sufficiently to trap the liberated $CO_2$, and the material develops elastomeric properties so that it will expand with the gas being formed. Assuming the letter A represents

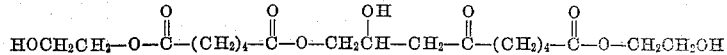

a typical long-chain polymer material has the following type of structural formula:

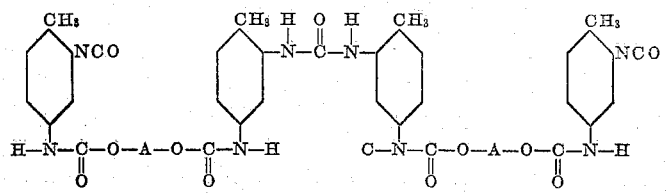

It will accordingly be appreciated that the polyurethane foam in accordance with this invention is produced by mixing together at least two chemical mixtures which react to produce a long-chain polyurethane product and to produce carbon dioxide which foams the product providing a gradual expansion as the polyurethane chain increases in length. In actual practice the chemical charges which are used may be themselves mixtures rather than pure compounds. One such mixture may contain a polyester diisocyanate prepolymer plus unreacted toluene diisocyanate, while the other charge may consist of the alkyd resin having terminal and secondary OH groups, urea catalyst, emulsifying agent and water. In any event, when the two charges are mixed together, they react under controlled conditions and gradually produce the polyurethane foam within the meaning of the term as used in connection with this invention.

Turning now to the specific embodiment of the invention selected for illustration in Figs. 1 to 7 of the drawings, the number 20 comprehensively designates a combined reaction and assembly apparatus wherein the chemical charges are mixed, distributed and reacted and joined to the fabric. The apparatus 20 has a supporting framework 21 which supports a continuously operative lower horizontal belt conveyor 22. Spaced above the conveyor 22 is a continuously operative automatic upper belt conveyor 23. Also supported on the framework 21 are two continuously operative side belt conveyors 24, 24, the working runs of which extend along the respective side edges of the run of the lower horizontal belt conveyor 22.

Mounted on a support 25 above the conveyors is an upper fabric roll 26 carrying a roll of fabric F which extends over an idler roll 27 and then under a forward end roll 28 of the upper conveyor 23.

Supported on a support 30 below the conveyors is a lower fabric roll 31 carrying a roll of fabric F' which extends upwardly over an end roller 32 of the lower belt conveyor 22 and extends face down on the upper working run of the belt conveyor 22.

Means are provided for mixing the chemical charges from which the polyurethane foam is made, feeding the mixed charges to the upper surface of fabric F', and distributing the mixed charges over the surface of the fabric F'. This means includes a mixer 33 having a self-contained motor, driving a gear 34 in mesh with a transversely extending rack 35. The mixer 33 also carries an inverted channel 36 which is slidable along a transversely extending angle 37 which is parallel to the rack 35. Accordingly it will be appreciated that the mixer 33 is movable transversely above the upper surface of the fabric F'.

The mixer 33 includes a feed means 40 for one chemical charge and another feed means 41 for the other chemical charge and also includes a discharge tube 42 for placing the chemical reactants (in a highly viscous form) on the surface of the fabric F'. This causes the gradual formation of the polyurethane foam P.

Means are provided for drawing the fabric F' longitudinally through the apparatus 20, with the fabric F' on its conveyor 22 and the fabric F adjacent to the lower run of its conveyor 23. The number 43 designates a motor which operates through a sprocket 44 and chain 45 to drive three sprockets 46 which are connected to revolve three collector rolls 47. The end rolls 47 as shown in Fig. 1 are arranged to collect fabric F and fabric F', while the central roll collects a sheet of polyurethane, as will further be described.

Means are provided for driving the side conveyors 24 at the same linear speed as the conveyors 22, 23. This means includes bevel gears 50, 51 which are connected through shaft 52, sprocket 53, and chain 54, sprockets 55 and shaft 56 to a drive roller 57 (Figs. 2 and 4) which drives one of the side conveyors 24. The chain 54 meshes with a sprocket 62 which drives a shaft 63 connected to another drive roller 64 to drive the other side conveyor 24, all as shown in Fig. 4 of the drawings.

The lower conveyor 22 is driven from gears 70, 71 (Fig. 2) which are connected to rotate an end roller of said conveyor 22. Similarly, the upper conveyor 23 is driven by gears 72, 73, and 74 which are connected to an end roller of the conveyor 23.

Referring more particularly to Figs. 1, 2 and 4 of the drawings, it will be observed that a rigid plate 75 extends between the side walls 76 of the apparatus 20. The rigid plate 75 is flat and substantially horizontal, and is located immediately above the lower run of the upper conveyor 23. Another rigid plate 77 is pivoted by means of sets of bearings 80, 81 and a transverse rod 82 to the plate 75. The forward end roll 28 of conveyor 23 is pivoted to the plate 77.

Means are provided for adjusting the angle of inclination of the plate 77 with respect to plate 75. The bearings 80, 80 are fixed to the rod 82, which carries at its end a control wheel 83 provided with a control pin 84 which is arranged to be inserted into any one of a group of holes 85 which extend through the side wall 76. This is an important and advantageous feature of this invention, as will further become apparent.

It will also be observed, referring particularly to Fig. 3, that the side walls 76 include rigid side plates 78, 78 which extend parallel to and just outwardly of the working runs of the side conveyors 24. The side plates 78, 78 coact with the top plate 75 and with a bottom plate 79, which extends parallel to and just below the upper run of lower conveyor 22, to form essentially a restrictive housing through which the reaction mixture passes, and in which it is laterally and upwardly and downwardly confined, as the foam forming reaction proceeds.

It will be understood that the foam swells as the foam forming reaction proceeds, producing an internal pressure which is resisted by the plates 75, 78, 78, 79, confining the reaction mixture, and that the reaction gradually proceeds while such confinement is maintained thereby forcibly imbedding the polyurethane in the fibers of the fabrics F and F'. This is an important feature.

Means are provided for curing the polyurethane foam after it has been formed, and for splitting the polyurethane product. The number 86 designates a curing chamber which contains heaters (not shown) which may be of the dielectric or any other type. The cured foam combined with the fabrics F, F', having the form illustrated in Fig. 5 of the drawings, is then continuously passed over a roller 87 and between a pair of rollers 90, 91 immediately below which are a pair of band saws 92, 93, which are driven from pulleys 94, 95, 96 and belt 97. The band saws 92, 93 split the polyurethane into two pieces joined to the fabric as illustrated in Fig. 6, and also provide a central sheet of polyurethane flexible foam as illustrated in Fig. 7.

The process just described is very advantageous in view of the fact that it is difficult to control the foaming characteristics of the polyurethane foam reaction unless the foam has a substantial thickness. It is desirable to produce fabric having a thin coat of polyurethane foam notwithstanding the characteristics of the foam reaction, and the process described above accomplishes this object. Moreover, polyurethane foam, unlike other foams, tends to form a thick skin of relatively solid, unfoamed material at each surface, which undesirably decreases or eliminates the "through porosity" of the foam. The foregoing method overcomes this difficulty, too, since each exposed surface of the foam sheet product (Fig. 7) has been derived from a central portion of the polyurethane block as formed, and therefore has no surface skin.

Fig. 8 shows a modified form of the method, wherein the fabric sheets F, F' are fed respectively under and over rollers 100, 101 for contact with the polyurethane foam after the foam has completed its reaction between the upper and lower conveyor belts 23, 22, but before said foam has been cured. It has been discovered that polyurethane foam, when made as heretofore described and as particularly disclosed in Fig. 8, has extremely adhesive surfaces which form a secure and permanent bond with the fabric. In this character polyurethane foam differs sharply from foam rubber.

In accordance with the method shown in Fig. 8, the combined foam and fabric may be cured as heretofore described and the foam may then be split, using a saw or other cutter such as the knife 102. It will be noted that, in Fig. 8, the foam sheet is split at its center, producing two pieces of foam coated fabric but no intermediate foam sheet. This procedure is advantageous when it is desired to produce fabrics having relatively thick polyurethane coatings, or where special procedures are utilized which enable the operator to produce a uniform but very thin sheet of polyurethane foam in the apparatus shown in Fig. 8.

The operation of the apparatus shown in the drawings will readily be apparent. Chemicals are mixed together which form a reaction mixture which reacts quite slowly to produce a long-chain polyurethane polymer and carbon dioxide. The carbon dioxide causes the polymer to swell into a foam. When the two pieces of fabric F, F' are moved at a common linear speed with one fabric spaced above the other, and when the reaction mixture is continuously fed between said fabrics, the reaction mixture gradually swells, forcing the upper fabric F upwardly against the reinforcing plate 77 which is inclined relative to the horizontal. Until the fabric F contacts the plate 77, carbon dioxide diffuses through the fabric and escapes. However, when the fabric F is forced against the plate 77, carbon dioxide is confined within the space defined by the plates 77, 78, 78, 79, thereby creating an internal reaction pressure in the polyurethane foam. However, the inclination of the plate 77 allows the foam to expand gradually as it progresses through the processing apparatus. The internal pressure is further increased when the reaction mixture reaches a location under the confining plate 75, which is horizontal and parallel to the bottom plate 79. Under those conditions of confinement, the reaction mixture continues in its tendency to swell, thereby forcing some of the partially polymerized polyurethane material into the fibers of the fabric. As the reaction progresses, the formation of the polyurethane is completed and the foam is uniformly and securely locked to the fabric. Moreover, because of the internal pressure present, the polyurethane foam is extremely uniform in character.

Although this invention has been described with reference to specific apparatus and methods, it will be appreciated that numerous variations may be made without departing from the scope of this invention. For example, equivalent elements and steps may be substituted for those specifically described, parts may be reversed, and various features may be used independently of the use of other features, all without departing from the spirit and scope of this invention as defined in the appended claims.

Having thus described my invention, I claim:

1. In a method of making polyurethane foam coated fabric from chemically reactive polyurethane resin forming chemicals, which chemicals also gradually react to produce gaseous carbon dioxide which swells the resin, forming it into a foam, the steps which comprise continuously moving two sheets of fabric with one fabric sheet spaced above the other, introducing said chemicals between the fabrics whereby said chemicals gradually swell between said fabrics, inclining a portion of one of said fabrics with respect to and away from the other fabric in the direction of fabric movement, maintaining another portion of the upper fabric substantially parallel to the lower fabric to bond the fabrics to the foam, and splitting said foam intermediate said fabrics.

2. The method defined in claim 1, wherein the upper fabric is inclined upwardly away from the lower fabric, the inclined portion of the upper fabric is adjacent to the position where said chemicals are introduced, and wherein the remainder of the upper fabric is confined against the foam and substantially parallel to said lower fabric.

3. In a method of making polyurethane foam coated fabric from chemically reactive polyurethane resin forming chemicals, which chemicals also gradually react to produce gaseous carbon dioxide which swells the resin, forming it into a foam, the steps which comprise continuously moving two sheets of fabric with one fabric sheet spaced above the other, introducing said chemicals between the fabrics whereby said chemicals gradually swell between said fabrics, inclining a portion of the upper fabric upwardly away from the lower fabric in the direction of fabric movement, confining said inclined portion against upward movement in opposition to the upwardly directed pressure of the foam reaction product, maintaining the remainder of the upper fabric substantially parallel to the lower fabric to bond the fabrics to the foam, confining said remainder of said upper fabric against upward movement in opposition to the upwardly directed pressure of the foam reaction product, curing the polyurethane foam, and severing said foam intermediate said fabrics.

4. Apparatus for making polyurethane foam coated fabric comprising substantially horizontal lower and upper conveyor belts respectively having upper and lower working runs for advancing vertically spaced lower and upper fabrics continuously, drive means connected for driving said conveyor belts to move the fabrics from a feed end to a discharge end of said conveyor belts, a flat horizontal support plate below the upper run of the lower conveyor belt, a flat inclined plate above and in contact with a portion of said upper conveyor, a flat horizontal plate above and in contact with the remainder of the upper conveyor, means for introducing polyurethane foam producing chemicals on the fabric supported on the lower conveyor, means for curing the product, and means for splitting the cured foam along a plane intermediate said fabrics.

5. In an apparatus for producing polyurethane foam coated fabric from sheets of fabric and from polyurethane foam forming chemicals which expand when mixed to form the foam, the combination which comprises mixing means for the foam forming chemicals, a pair of substantially horizontal, vertically spaced continuous belt conveyors, means for feeding separate upper and lower sheets of fabric intermediate said belt conveyors, means for introducing the mixed chemicals on the lower fabric sheet, a substantially horizontal, flat supporting means just below the lower belt conveyor, and a substantially horizontal flat confining means just above the upper belt conveyor.

6. The apparatus defined in claim 5, wherein the flat confining means is an elongated metal plate.

7. The apparatus defined in claim 5, wherein the flat confining means comprises an inclined plate adjacent the feed end of the upper conveyor and another plate spaced from said feed end.

8. The apparatus defined in claim 7, wherein said plates are hinged to one another, and wherein means are provided for adjusting the inclination of said inclined plate.

9. In an apparatus for producing polyurethane foam coated fabric from sheets of fabric and from polyurethane foam forming chemicals which expand when mixed to form the foam, the combination which comprises mixing means for the foam forming chemicals, a pair of continuous conveyor means horizontally arranged and vertically spaced from one another, a pair of continuous side conveyors which are vertically arranged adjacent the side edges of said horizontal conveyors, means for feeding separate upper and lower sheets of fabric intermediate said belt conveyors, means for introducing the mixed chemicals on the lower fabric sheet, a substantially horizontal, flat supporting means located just below the lower horizontally arranged conveyor, flat confining means located just outwardly of each of said side conveyors, and a flat confining means just above the upper horizontally arranged conveyor which includes a pair of members which are hinged to one another whereby one of said members may be inclined relative to the other.

10. In a method of making polyurethane foam coated fabric the steps which comprise mixing together a plurality of chemicals which form a reaction mixture to produce a long chain polyurethane polymer and carbon dioxide which causes said polymer to swell into a foam, continuously moving two spaced-apart, tensioned belts at a common linear speed with one belt inclined with respect to the other belt such that the spacing between said belts gradually increases, continuous feeding spaced-apart fabrics on said belts, continuously feeding said reaction mixture between said fabrics, continuing the advancement of said belts and fabrics while said reaction mixture swells, and applying pressure to the belts confining the swelling of said reaction mixture top and bottom and from the sides, whereby the self-created pressure of the reaction mixture firmly and securely locks the polyurethane foam to the fabrics.

11. In a method of making polyurethane foam coated fabric from chemically reactive polyurethane resin forming chemicals, which chemicals also gradually react to produce gaseous carbon dioxide which swells the resin, forming it into a foam, the steps which comprise continuously moving two sheets of fabric substantially parallel to one another, with a portion of one such fabric inclined slightly with respect to the other fabric in the direction of fabric movement, introducing said chemicals between said fabrics at a location where said fabrics are closest to one another, and continuing the movement of said fabrics while maintaining a portion of one such fabric inclined relative to the other such fabric in the direction of fabric movement, while confining said fabrics against the pressure developed from the reaction of said chemicals.

References Cited in the file of this patent

UNITED STATES PATENTS

| | | |
|---|---|---|
| 1,696,129 | Silver | Dec. 18, 1928 |
| 1,884,106 | Moran | Oct. 25, 1932 |
| 2,434,527 | Untiedt | Jan. 13, 1948 |
| 2,441,235 | Blair et al. | May 11, 1948 |
| 2,463,289 | Leguillon | Mar. 1, 1949 |
| 2,690,987 | Jeffries et al. | Oct. 5, 1954 |
| 2,732,324 | Morris | Jan. 24, 1956 |

FOREIGN PATENTS

| | | |
|---|---|---|
| 136,585 | Sweden | July 15, 1952 |
| 499,973 | Belgium | Mar. 31, 1951 |
| 823,870 | Germany | Dec. 6, 1951 |
| 842,267 | Germany | Sept. 15, 1952 |
| 1,038,008 | France | May 6, 1953 |